W. E. CHOATE.
SNAP FASTENER ASSEMBLING MACHINE.
APPLICATION FILED APR. 17, 1913.

1,184,073.

Patented May 23, 1916.
6 SHEETS—SHEET 3.

Witnesses:

Inventor:
W. E. Choate
by Attorneys.

W. E. CHOATE.
SNAP FASTENER ASSEMBLING MACHINE.
APPLICATION FILED APR. 17, 1913.

1,184,073.

Patented May 23, 1916.
6 SHEETS—SHEET 4.

Fig. 6.

W. E. CHOATE.
SNAP FASTENER ASSEMBLING MACHINE.
APPLICATION FILED APR. 17, 1913.

1,184,073.

Patented May 23, 1916.
6 SHEETS—SHEET 5.

Witnesses:
Inventor:
W. E. Choate
Attorneys

W. E. CHOATE.
SNAP FASTENER ASSEMBLING MACHINE.
APPLICATION FILED APR. 17, 1913.

1,184,073. Patented May 23, 1916.
6 SHEETS—SHEET 6.

Witnesses:
P. W. Pezzetti
G. L. Johnson

Inventor:
W. E. Choate
by Wright Brown Quinby May
Attorneys.

UNITED STATES PATENT OFFICE.

WILLIAM E. CHOATE, OF HAMILTON, MASSACHUSETTS, ASSIGNOR TO CARR FASTENER COMPANY, OF BOSTON, MASSACHUSETTS, A CORPORATION OF MAINE.

SNAP-FASTENER-ASSEMBLING MACHINE.

1,184,073.　　　　　Specification of Letters Patent.　　Patented May 23, 1916.

Application filed April 17, 1913. Serial No. 761,693.

*To all whom it may concern:*

Be it known that I, WILLIAM E. CHOATE, a citizen of the United States, and residing at Hamilton, in the county of Essex and State of Massachusetts, have invented certain new and useful Improvements in Snap-Fastener-Assembling Machines, of which the following is a specification.

This invention relates to machines for attaching members of separable fastenings to their carrying parts, which latter may be garments such as coats or gloves, or other articles such as carriage and automobile curtains. For the purpose of brevity of description, without intending it as a limiting term, the carrying part will be hereinafter referred to as fabric.

There are now on the market separable fastenings of such structure as to render it practically essential that the members shall be secured to the fabric in a predetermined relationship to the line of pull on the fabric which is held by the separable fastenings, and so that separation of the two members of the fastenings cannot be effected excepting when one member occupies a predetermined position rotative relatively to the other member. And there are fastenings which, for other reasons, such as their being non-circular in outline, need to be secured to their carrying fabric with uniformity. For instance, the socket members *a* shown in the accompanying drawings which illustrate one embodiment of my invention, are elliptical or elongated in form; each having a major and a minor axis. It is desirable that a row of these members, such as when employed in lieu of button-holes of a garment or curtain, shall all be secured turned the same way relatively to the edge of the garment or curtain.

One of the objects of my invention is to provide a machine for assembling the snap-fastener members with the carrying fabric, with uniformity in the respect above mentioned, and so as to render it unnecessary to rely upon the care of the operator to prevent affixing a member turned improperly, or with either axis extending in the wrong direction.

A further object is to provide a machine of this character so constructed that movements which require to be given by the operator, must be complete ones, incomplete movements doing no harm.

A further object is to provide a machine of this character having means for indicating when the supply of fastenings in the chute or magazine is nearly exhausted, or if a defective fastening member, or one wrongly carried, is about to reach position for delivery to the clenching mechanism.

To these ends the invention consists in the improvements which I shall now proceed to describe and claim.

Of the accompanying drawings, Figs. 2 and 3 are plan views of the mechanism below line 2—2 of Fig. 1, on a larger scale. Fig. 3 is a view similar to Fig. 2, showing some of the parts in different positions.

Similar reference characters indicate the same or similar parts in all of the figures.

Figure 4:
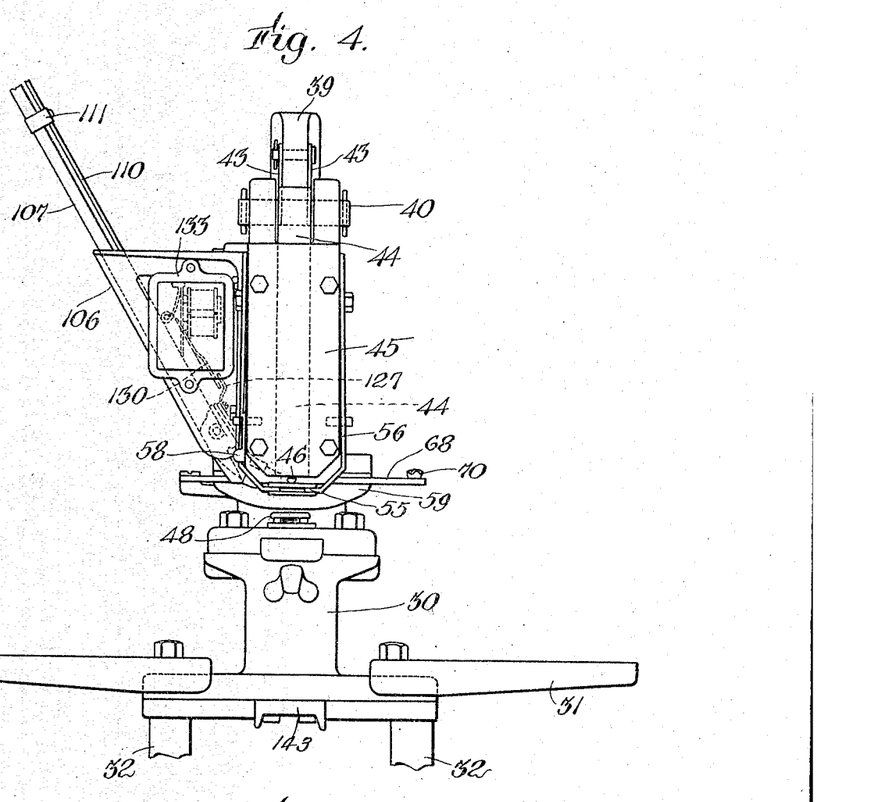
Fig. 4 is an elevation from the left of Fig. 1.

The base 30 of the machine which may be provided with tool or work-supporting wings 31 (Figs. 1 and 4), is shown as supported upon suitable legs 32. Depending from the base 30 is a bracket 33 to which a lever 34 is pivotally connected, as at 35, said lever being adapted to be swung on its pivot by any suitable means such as a foot treadle, not shown. An adjustable link 36 connects the upper end of the lever 34 with the joint of toggle-links 37, 38, the lower end of the latter being pivotally connected to the bracket 33, and the upper end of the link 37 being pivotally connected to the top lever 39 which is pivoted at 40 to the arm 41 of the machine. Suitable stop devices such as a screw 42 will be employed to limit the movement of the lever 39 in one direction, under the influence of springs, if desired, said springs not being shown. One end of the lever 39 has a link connection 43 with the upper end of a plunger 44, movable vertically in suitable ways carried by the head 45, the lower end of said plunger having a centering stud 46 which is adapted to enter the hole of the socket member $a$, said stud being provided with a reduced neck so that when the stud enters the hole of the member $a$, the spring jaws of said member $a$ will engage the reduced neck of the stud 46 for a purpose hereinafter described.

Figures 2, 3:
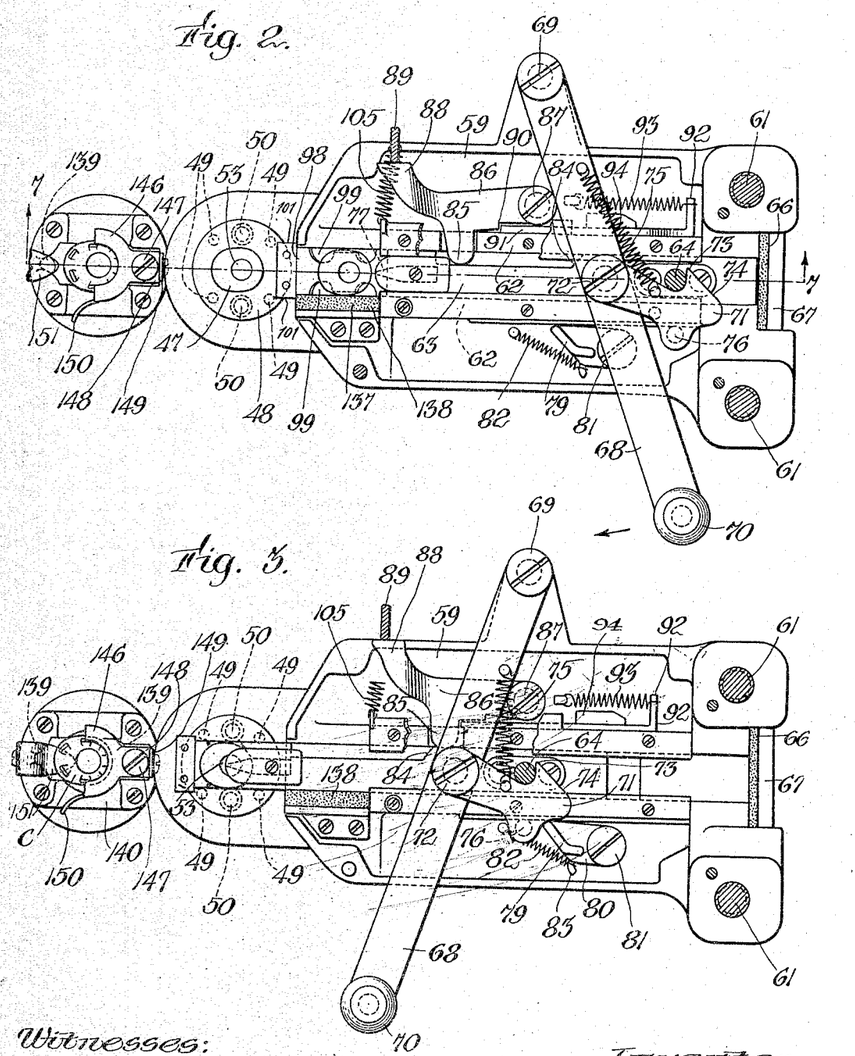
Figures 7, 8:
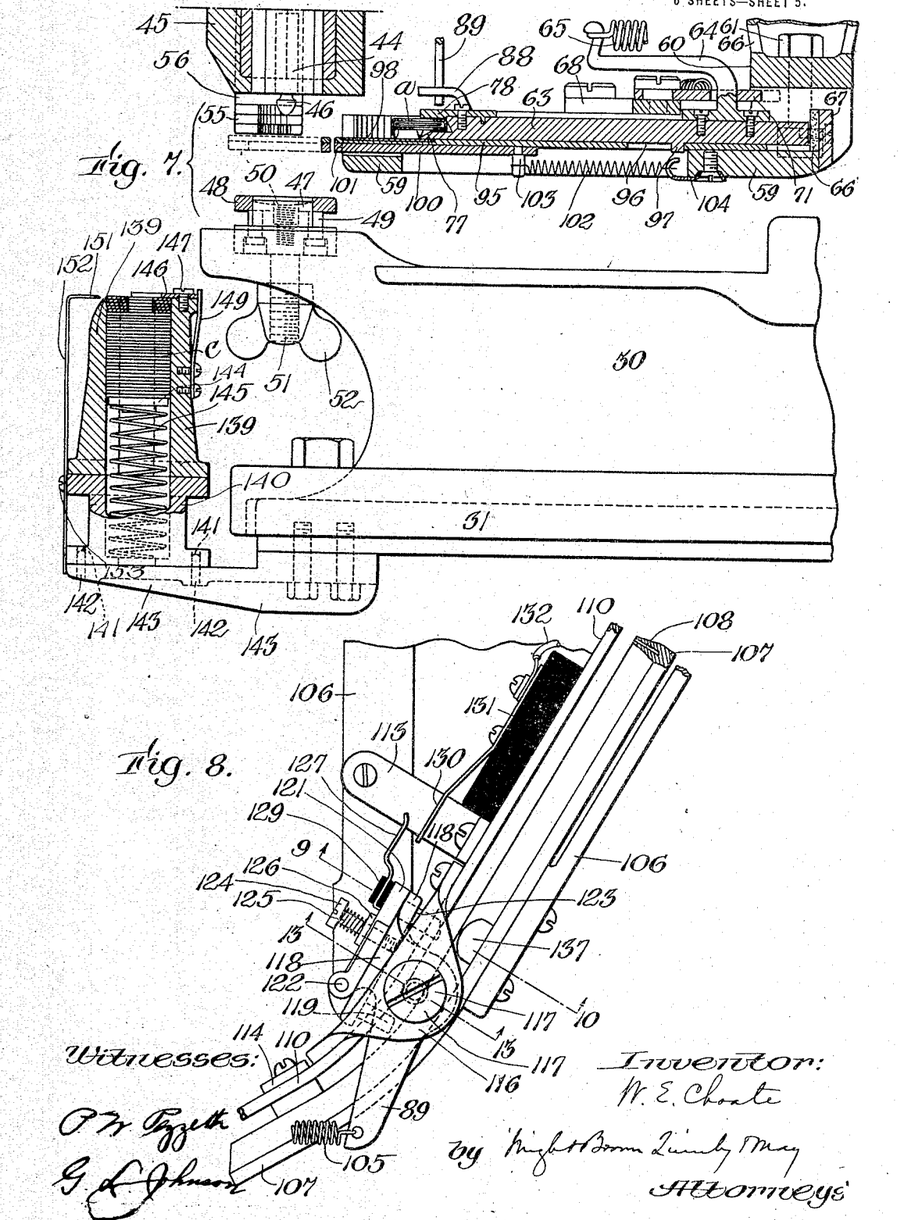
Fig. 7 represents a vertical section on line 7—7 of Fig. 2.
Fig. 8 is a view similar to a portion of Fig. 6, but showing the parts in elevation, instead of section.

Supported by the base 30 of the machine is the anvil 47, which is elliptical in outline and somewhat concave, to correspond with the shape of the elliptical socket member $a$ which is to be attached to its carrying fabric, this shape being best illustrated by comparing Figs. 2 and 7. The anvil 47 has a yielding flange 48 surrounding it, said flange being mounted upon pins 49 which pass through openings in the base and have heads to limit the upper movement of said flange under the influence of springs 50. The anvil has a stem 51 passing down through an arm or projecting portion of the base 30, a wing nut 52 engaging the threaded lower end of the stem 51, enabling the anvil to be secured in place, or to be released for the substitution of another anvil. Of course, it is to be understood that the plunger 44 has its lower end formed to engage a member $a$ so as to clench the prongs thereof to the fabric $b$ (Figs. 17, 18 and 19), the anvil having a recess 53 to receive the stud 46.

When the fabric to which the members $a$ are to be attached is inserted above the anvil, said fabric may be carried to any desired extent inwardly and under the arm 41 (Fig. 1), a curved plate 54 guiding said fabric. This structure permits the fasteners to be connected to the edge portion of fabric which, as a whole, is pushed in under the arm 41. The desirability of this is due to the fact that the socket members $a$ are so shaped and constructed that their spring jaws $a^2$ (Fig. 19) shall extend in a certain direction relatively to the edge of the fabric. The structure just described permits the members $a$ to be secured to either edge of a quite wide piece of fabric, with the oval-shaped members $a$ and jaws $a^2$ occupying the same positions relatively to such edge, no matter which edge is having the members $a$ attached thereto.

Figure 6:
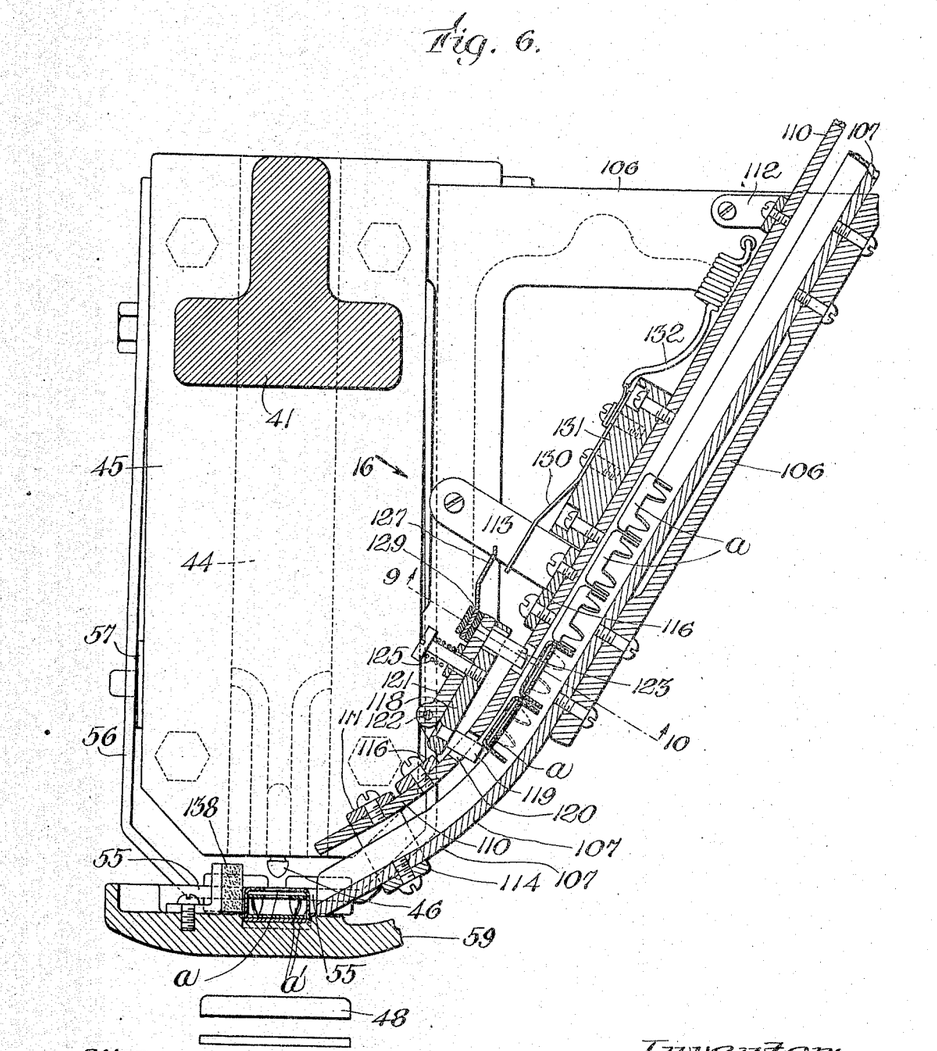
Fig. 6 represents a section on line 6—6 of Fig. 1, on a larger scale, looking in the direction of the arrows.

As hereinafter described, the devices $a$ are automatically supplied by a chute or runway, one by one, and they are individually transferred to position to be acted upon between the plunger and the anvil to have the prongs $a'$ clenched to the fabric. To temporarily retain each device $a$ in position, I provide jaws 55 (Figs. 4 and 7) suitably shaped to engage opposite edges of the device $a$, said jaws being carried by the lower ends of spring arms 56 secured to the sides of the head 45. In order that the operativeness of these spring jaws may be interrupted, as for instance, when it is desired to have a device $a$ thrown out as soon as transferred from the chute by the pusher hereinafter described, I provide a cam 57 having a lever 58, the cam 57 being thin and beveled and adapted to be forced in between one of the arms 56 and the side of head 45 when the handle 58 is manipulated, such operation resulting in holding one arm 56 outwardly, as indicated at the left in Fig. 6, thus spreading the jaws so that they will not grip a device $a$.

Figure 5:
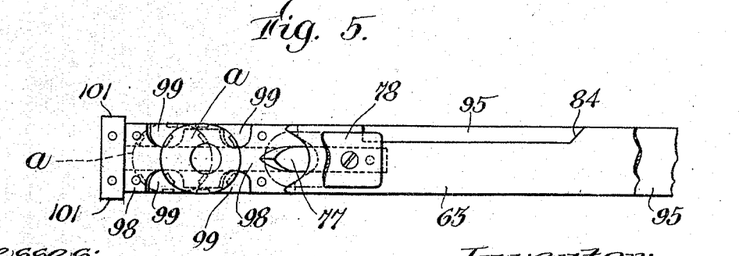
Fig. 5 is a detail plan view of a portion of the pusher, and the straightening or locating slide below said pusher.

Referring now to the pusher and its mechanism and coöperating devices, a table 59 (Figs. 1, 2, 3, and 7) is connected to a bracket 60 depending from the arm 41, as by bolts 61. The table 59 is provided with ways 62 for the pusher 63, having an upwardly and forwardly curved arm 64 the end of which is connected by a spring 65 to a suitably fixed part of the frame, so that said spring will tend to normally retract the pusher toward and against a cushion 66, supported by a back rib 67. A lever 68 pivoted at 69 and having a handle 70 has a latch 71 pivotally connected thereto at 72, said latch having a hook 73 and a cam edge 74. A spring 75 connects said latch with the lever 68 and acts in a direction to hold a pin 76 extending downwardly from the latch against the side of one of the ways 62. The pusher 63 has a recessed front edge as best illustrated in Fig. 5, and is formed with a projecting pointed and beveled toe 77 (see also Fig. 7). Projecting over the toe 77 is a holder-plate 78 so as to constitute between it and said toe a recess for a portion of each socket member $a$.

A cam-shaped tripper 79 is carried by an arm 80 pivoted to the table, as by a screw 81, a spring 82 connecting a pin 83 of said arm 80 with a suitably fixed point so as to normally hold the cam tripper in the position shown in Figs. 2 and 3. When the lever 68 is shifted from the position shown in Fig. 2 to the position shown in Fig. 3, so as to transfer a device $a$ that has been deposited in front of the pusher by the chute presently described, to position beneath the plunger, the pin 76 acts upon the rear face of the cam rib 79 and simply pushes the latter aside, but on the return movement of the pusher, under the influence of spring 65, the pin 76 engages the outer face of cam rib 79 and causes the latch 71 to be disengaged from the arm 64 so that the spring 65 carries the pusher back during the latter part of its rear movement, without regard to the lever 68. This structure trips the latch which connects the lever with the pusher so as to insure the pusher making a full back stroke under the influence of spring 65. For reasons hereinafter explained, it is necessary for the best operation of the machine to render it certain that the operator cannot operate the machine a second time without having the plunger retreat to its extreme limit after each preceding operation. Furthermore, this structure results in releasing the pusher so that the spring throws it back with force enough to jar the machine a little and facilitate the gravity feed of the device $a$ down the chute hereinafter described. It will be understood, of course, that after the pusher has been thrown back by its spring, the operator cannot again advance the pusher without first carrying the lever 68 back far enough so that the cam edge 74 of the latch 71 will first ride along the side of arm 64, and then the hook 73 will be caused to reëngage the arm 64, under the influence of the spring 75, as shown in Fig. 2.

The pusher 63 is formed or provided with an edge cam 84 (Figs. 2, 3, and 5), which cam acts, when the pusher is advanced, upon the lug or projection 85 of the escapement pawl 86 which is pivoted to the table 59 at 87, the end of said pawl 86 being curved upwardly, as best shown at 88 in Fig. 7, to a position to engage one side of the arm 89 of the chute escapement mechanism hereinafter described, so that each forward movement of the pusher will cause the chute escapement to be actuated through the medium of said pawl 86. In order that the escapement may be locked so that it can act only at the very last of the stroke of the pusher rearwardly, the pawl 86 is formed with a shoulder 90 adapted to be engaged by a lock slide 91 having an arm 92 connected by a spring 93 (Fig. 2) with a suitably fixed point, said slide having also a shoulder 94 against which one edge of the lever 68 will contact when said lever is moved rearwardly. When the lever 68 is moved to the position shown in Fig. 3, the cam 84 has acted upon the pawl 86 to swing the latter, the shoulder 90 of the pawl being thus moved aside so as to permit the spring 93 to advance the lock slide to the position shown in Fig. 3. When the lever 68 is then swung rearwardly or back to the position shown in Fig. 2, the pawl 86 must remain in the position shown in Fig. 3, until the rear edge of lever 68 engages the shoulder 94 of the lock slide, so that during the last part of the rearward movement of the lever 68, the lock slide will be pushed back until its end escapes from the shoulder 90 of the pawl 86, so that said pawl, by the pressure against it of the arm 89 under the influence of a spring hereinafter described, will return to the position shown in Fig. 2.

Each device $a$, when it leaves the chute hereinafter described, lands upon the upper surface of a slide 95 beneath the pusher 63 and which projects forwardly therefrom as shown in Fig. 7, the prongs of the device $a$ bearing upon said slide. The slide 95 has a slot 96 which receives a pin 97 projecting downwardly from the pusher so as to permit a relative movement of the slide and pusher, for a purpose presently explained. The upper surface of the forward end of the slide is provided with a hardened steel facing 98, the edges of which are cut away to form recesses 99 (Figs. 2 and 5), the portion of the facing 98 which forms the front margins of said recesses being preferably slightly beveled, for a purpose presently explained. A reinforcing strip 100 suitably secured to the slide 95 is formed with stop shoulders 101 at opposite edges of its front end, arranged to abut against the front end of the table 59, so as to limit the rearward movement of said slide 95 under the influence of a spring 102 which connects a pin 103 projecting downwardly from the slide, with a fixed hook 104.

When a device $a$ lands in substantially the position shown in Fig. 7, it would be liable to be slightly turned from a proper position. Its prongs, if not entering the recesses 99, should be made to do so, and this effect is produced by the slight play which the pusher has relatively to the slide 95, during the first advance of the pusher. While the pusher advances the distance determined by the pin 97 of the pusher riding along the slot 96 of the slide, the beveled and pointed toe 77 of the pusher passes between two of the prongs $a^2$ of the device $a$ and then pushes the device along so that other prongs of the latter, engaging the beveled margins of recesses 99, will be turned to exact proper position. In other words, the first forward movement of the pusher causes the prongs of the device $a$ to so engage the recesses of the steel facing 98 as to properly center the device and cause it to be properly forced between the jaws 55.

The escapement arm 89 is acted upon by a spring 105 (Figs. 2 and 8), so as to normally hold the escapement with its pins in the position shown in Fig. 8, the movement of the pawl 86, actuated by the pusher, as hereinbefore described, oscillating said escapement by means of its arm 89. Said escapement is mounted, as presently described, in a bracket 106, (Fig. 6,) secured to and projecting from the chute 107, which latter has a guide groove 108 for some of the prongs of the device $a$, as shown by comparing Figs. 6 and 9 to 16, inclusive. The upper end of the chute is shown as provided with a coupling member 109, (Fig. 16,) which is merely for use in temporarily connecting with said chute a loading device. A cover strip 110 against which the top surface of the device $a$ may ride, is suitably supported, as by a series of brackets, 111, 112, 113, 114. Secured to the upper end of the cover plate 110 is a sample device or indicator 115, this being either one of the devices $a$ itself, or a correct dummy thereof, said indicator being so like the devices $a$, and so positioned that a person supplying devices $a$ to the chute will see at once the proper position for inserting the devices under strip 110 so that they will properly ride down the chute.

A bracket 116 (Figs. 8 and 13) is secured to the strip 110 and carries a pivot screw 117 for the escapement device, said escapement device including not only the arm 89 hereinbefore mentioned, but also a plate 118 integral with or rigidly connected to said arm 89, which plate 118 carries the devices which I shall now describe. The plate 118 has a pin 119 (Fig. 14) adapted to move through a hole 120 in the strip 110. An arm 121 is pivotally connected at 122 to the plate 118, and has a pin 123 passing through another hole in the strip 110, as clearly shown in Figs. 14 and 15. A screw 124 passes through a hole in arm 121 and is secured to the plate 118. A spring 125 coiled about the screw, is confined between the head of the screw and a washer 126 which bears upon the upper face of the arm 121. Said arm 121 has a spring contact 127 secured to it by suitable means, such as screws 128 (Fig. 16), suitable material 129 being provided to insulate the contact 127 from the part or parts which carry it.

Figure 1:
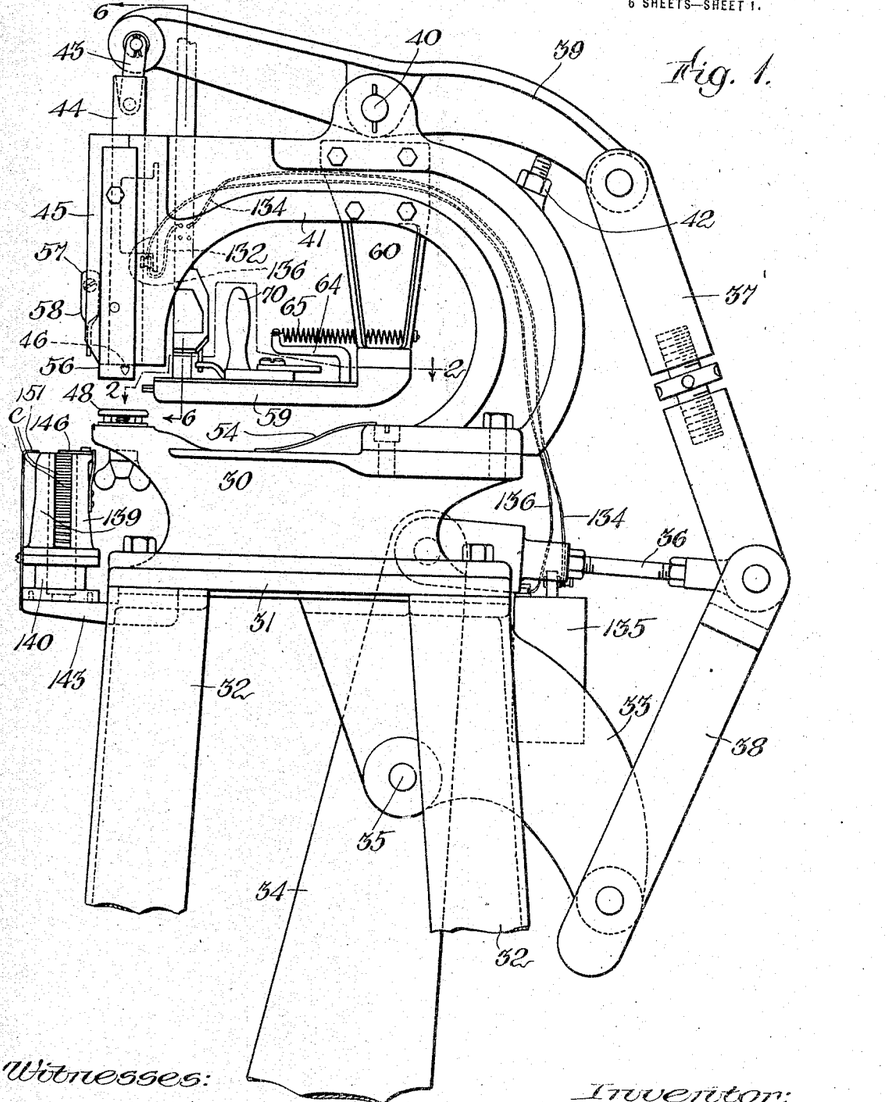
Figure 1 is a side elevation of a machine embodying my improvements.
Figures 9, 10, 11, 12, 13, 14, 15, 16, 17, 18, 19:
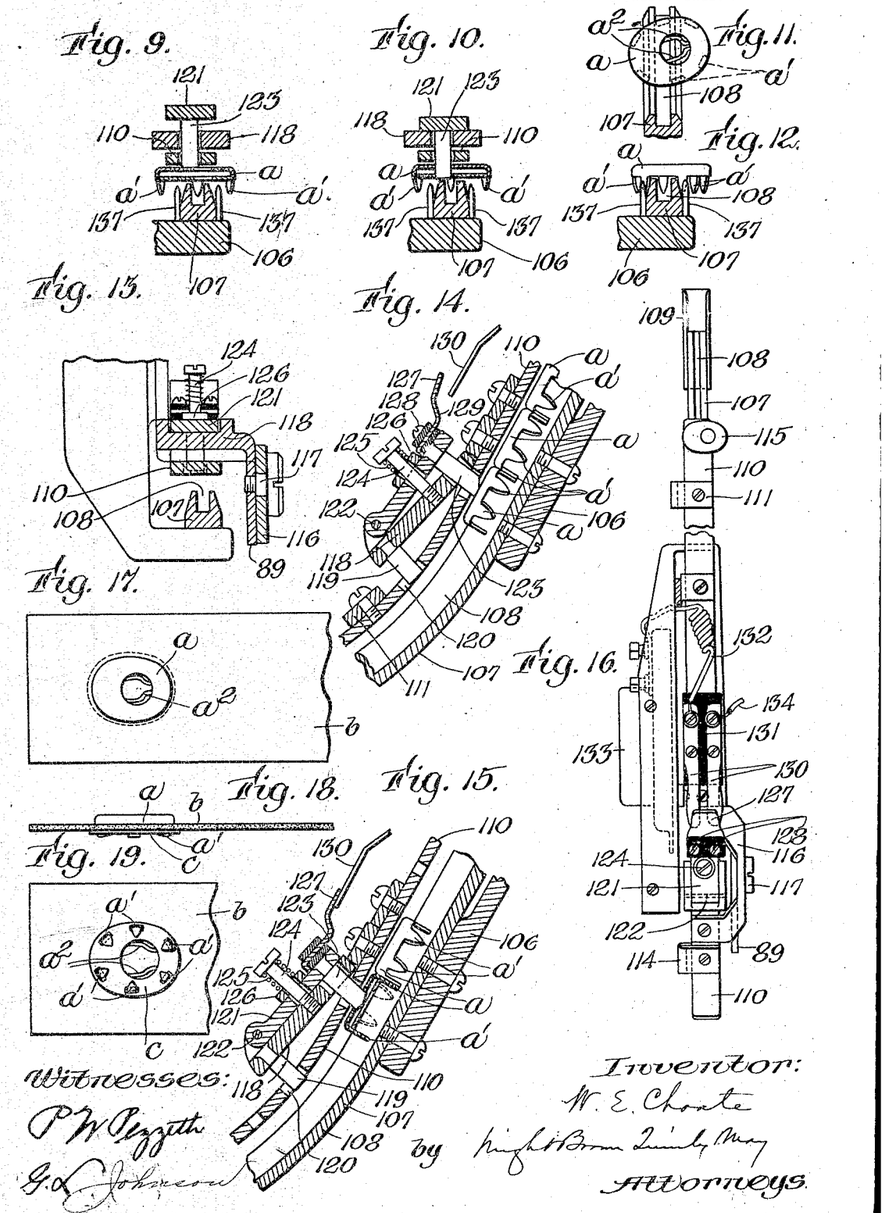
Figs. 9 and 10 represent sections on line 9—10 of Fig. 8, illustrating the operation of the indicator or alarm.
Fig. 11 is a detail view of a portion of the chute, to illustrate an incorrect position of an article moving along said chute.
Fig. 12 is a sectional view of the parts shown in Fig. 11.
Fig. 13 represents a section on line 13—13 of Fig. 8.
Figs. 14 and 15 are views similar to a portion of Fig 6, illustrating the operation of the indicator or alarm.
Fig. 16 is an elevation of the chute looking in the direction of the arrow 16 in Fig. 6.
Figs. 17, 18 and 19, are detail views of the socket member applied to its carrying part, such as a piece of fabric or curtain.

The contact 127 coöperates with two contacts 130 carried by an insulating block 131 suitably connected to the chute, so that when the contact 127 is in the position shown in Fig. 15, it will act as a switch to complete a circuit presently described, the terminals of which circuit consist of the two contacts 130. From one of the insulated contacts 130, a wire 132 (Figs. 6 and 16) leads to a signal 133 (Fig. 4), such as an electric buzzer. A wire 134 connects the other insulated contact 130 with a battery 135 (Fig. 1). A wire 136 connects the battery and buzzer. Whenever the contact 127 occupies the position shown in Fig. 15, it completes the circuit and the buzzer indicates to the operator that a device $a$ is about to be fed to the clenching mechanism in an incorrect position, or that the chute is empty, as will be presently explained.

While the margins of the devices $a$ are elliptical or elongated, their jaws $a^2$ which grip the complemental stud members (not shown), and the holes which enable such stud members to enter between said jaws, are not at the mid-length of the major axes of the devices; in other words, they are eccentric. Such devices cannot be readily handled or supplied by a magazine, or chute and feed devices, of usual form. With my improvements above described, when the chute is properly loaded, with all of the devices turned the same way, or in other words, with their major axes extending in the same direction, their holes will be in a line at one side of the pin 123 of the escapement, so that such pin cannot enter a hole, but can only bear upon the surface at one side of the hole, as shown by comparing Figs. 9 and 14. When at rest, the pin 119 (Fig. 6) arrests the devices $a$ in the chute. Then when the pawl 86 is released by the last rearward movement of the lever 68 and the consequent movement of the lock slide 91, as hereinbefore described, the pawl moving from the position shown in Fig. 3 to the position shown in Fig. 2, escapement arm 89 (Figs. 2 and 8) is acted upon by spring 105 to oscillate the escapement from the position shown in Fig. 6 to that shown in Fig. 14, releasing the lowermost device $a$ and letting it slide down the chute to the position shown in Fig. 7. At the same time, the pin 123, carried by the yielding arm 121, bears frictionally on the upper surface of the next device $a$ (Figs. 9 and 14) with sufficient pressure to arrest the devices until the escapement returns to the Fig. 6 position. If, however, a device comes down the chute turned wrongly, end for end as in Fig. 10, then the hole of that device is in position to let the pin 123 enter it as shown in Fig. 15, thus permitting contact 127 to bear on the two contacts 130 and cause the buzzer to sound, after which the operator can release that device $a$ by first operating cam 57 to open the jaws 55 and then operating lever 68 once. Of course, if the chute should be empty, the circuit will be completed in the same manner as shown in Fig. 15. If a device $a$ is placed in the chute in some intermediate incorrect position, such as indicated in Figs. 11 and 12, then at least, one of its prongs $a'$ will be close to the outer side of the chute. To arrest such an incorrectly placed device, I provide stop wings 137 (Figs. 8, 9, and 12) near the escapement, said stops being so located as to be in the path of one or more prongs if in the position of Fig. 12, but to permit the prongs to pass, if in the correct position of Fig. 9. Such incorrect positioning as shown in Figs. 11 and 12, seldom occurs, but when it does, and that device is arrested by a stop wing, the next action of the escapement causes the buzzer to sound the same as though the chute was empty. Then the operator can, with a suitable tool, force that device past 130 the stop wings and remove it, because the prongs $a'$ are not so stiff or strong as to prevent such forcing.

Each device $a$ when it slides to the position shown in Fig. 5, contacts with a buffer 138 (Figs. 2 and 6) of suitable yielding material to cushion the device and prevent it from rebounding out of the path of the pusher.

It will now be understood that I have provided a machine for setting, or assembling with fabric, fastening devices which have certain peculiarities of form, said machine having provisions adapted by the form of said devices to cause all of those members which reach the jaws 55 between the setting devices to assume perimetric positions insuring uniformity and correctness when secured to the fabric. By this I mean that each device reaching setting position does so with a definite part or point of its perimeter in exactly the same position relatively to the center of the space between the jaws 55 as the same part or point of the perimeter of every other device reaching setting position. To illustrate, in the particular devices $a$ illustrated, the jaws $a^2$ are not centrally located, and all the devices which reach the jaws 55 are turned to the same perimetric position to present said jaws $a^2$ at the same side of the axis or true center of the whole device. In other words, the machine includes means whereby the feeding means for supplying the devices controls said devices in such manner that only those which are turned to properly register in the predetermined manner can reach position to be secured to the fabric.

After the device has been transferred by the pusher to the jaws, it is in position to be pushed down by the plunger toward the anvil. Preferably, a clench plate is employed, the fabric being clamped between the device $a$ and clench plate $c$, as shown by comparing Figs. 17, 18 and 19, the prongs $a'$ of the device passing through orifices in the clench plate. As the clench plates necessarily correspond with the devices $a$ as to external form, and positions of its hole and prong-receiving orifices, the clench plates being elliptical or elongated, it is essential that each one shall be correctly placed on the anvil, the proper end innermost. To this end, I provide a magazine which holds a series of the clench plates in axial positions, corresponding to that of the devices $a$ reaching the setting members, so that the operator has to shift or move a plate $c$, but a very short distance, and with only a direct movement, to transfer it from the magazine to the anvil prior to operating the machine to cause the plunger to descend. In other words, the distance is so slight, and the relationship of the magazine to the rest of the machine is such, that there is no liability of the operator turning or rotating the clench plate while moving it from the top of the magazine straight across and slightly up, to the anvil. This structure and arrangement is best illustrated in Figs. 1, 2, 3, and 7, the magazine comprising two uprights 139 having their inner walls shaped to quite accurately fit the end edges of the pile of clench plates. The base 140 has a flange provided with holes 141 to fit over pins 142 projecting upwardly from a bracket 143 secured to the frame of the machine. These parts are so located that the top of the magazine 139 is close to, and directly in front of, the anvil 47 (Figs. 2 and 3). The most essential feature, however, is that the magazine has its transverse major axis parallel with that of the anvil, so that no turning movement is given to each clench plate being carried to the anvil, and consequently plates correctly placed in the magazine will be practically certain to be correctly placed on the anvil.

A platform 144 supports the pile of plates $c$ and is pressed upwardly by a spring 145 so that the top plate will be held against a top stop 146 partially overlapping it, but exposing sufficient area of the top plate to enable that one to be pulled out by the operator. The top stop is pivotally held by a screw 147 and has a heel 148, against which a spring 149 bears to hold the stop in the position shown. The said stop has a projecting lip 150 to form a finger piece to enable the stop to be turned aside when the magazine is to be loaded with a fresh supply. Owing to the fact that the clench plates $c$ do not have smooth surfaces (they have orifices and adjacent struck-up portions which receive the ends of the prongs of the devices $a$), it is preferable that means shall be provided for separating the top clench plate from the one next below it so that it will not catch when the operator desires to slide it out from below stop 146. To this end, I provide a separator comprising a blade or tongue 151, (Figs. 1, 2, 3, and 7), said tongue having a sharp, and preferably pointed edge and movable toward and from the pile of plates $c$ in the magazine, to enter between the top plate and the one next below it, and slightly raise the top one, or depress the others, the upper surface of the tongue presenting a smooth face over which the top plate $c$ can be readily slid. In the embodiment illustrated, the tongue 151 is composed of the upper bent end of a spring strip or arm 152, secured to the base 140, as by a screw 153. Normally the arm 152 and its tongue 151 occupy the position shown in Figs. 2 and 7. When a clench plate $c$ is desired, the operator presses a thumb against arm 152 to thrust the tongue under the top plate as indicated in Fig. 3. This separates the two upper plates and enables the top one to be easily slid out by one finger. This action of the tongue also holds back the lower plates so that the spring 145 cannot cause the top plate to be restrained by pressure against the stop 146.

I claim:

1. A machine for setting devices having a continuous perimeter and having an opening therethrough non-symmetrical with respect to one axis of said device, comprising coöperating setting members, a chute, and means for transferring the devices from the chute to said setting members, said means being constructed and arranged to insure uniformity in perimetric position of said opening and said device of all devices that reach position for setting.

2. A machine for setting devices having a continuous perimeter and having an opening therethrough non-symmetrical with respect to one axis of said device, comprising coöperating setting members, a chute, and means for transferring the devices from the chute to said setting members, said means being constructed and arranged to insure uniformity in perimetric position of said opening and said device of all devices that reach position for setting, means being provided for preventing any device from reaching setting position that is not in predetermined perimetric position.

3. A machine for setting devices having a continuous perimeter and having an opening therethrough non-symmetrical with respect to one axis of said device, comprising coöperating setting members, a chute, means for transferring the devices from the chute to said setting members, said means being constructed and arranged to insure uniformity in perimetric position of said opening and said device of all devices that reach position for setting, and means for arresting in the chute any device that is not in predetermined perimetric position.

4. A machine for setting devices having a continuous perimeter and having an opening therethrough non-symmetrical with respect to one axis of said device, comprising coöperating setting members, a chute, means for transferring the devices from the chute to said setting members, said means being constructed and arranged to insure uniformity in perimetric position of said opening and said device of all devices that reach position for setting, and means coacting with portions of improperly positioned devices to indicate the presence of any device that is out of predetermined perimetric position.

5. A machine for setting devices having a continuous perimeter and having an opening therethrough non-symmetrical with respect to one axis of said device, comprising coöperating setting members, a chute, means for transferring the devices from the chute to said setting members, said means being constructed and arranged to insure uniformity in perimetric position of said opening and said device of all devices that reach position for setting, an indicator, and means for operating the indicator if the machine is operated while the chute is empty.

6. A machine for setting pronged devices having a continuous perimeter and having an opening therethrough non-symmetrical with respect to one axis of said device, comprising coöperating setting members, a chute, means for transferring the devices from the chute to said setting members, said means being constructed and arranged to insure uniformity in perimetric position of said opening and said device of all devices that reach position for setting, and means for simultaneously engaging separate prongs of the devices to control the registration of said devices relatively to the setting members.

7. A machine for setting devices having a continuous perimeter and having an opening therethrough non-symmetrical with respect to one axis of said device, comprising coöperating setting members, a chute, means for transferring the devices from the chute to said setting members, said means being constructed and arranged to insure uniformity in perimetric position of said opening and said device of all devices that reach position for setting, and a clench-plate magazine in close relationship to said setting members, said magazine being formed to hold a column of clench plates corresponding in form to said devices, and to present said plates successively in a perimetric position corresponding to that of a device in position for setting.

8. A machine for setting devices of the character described, comprising coöperating setting members, feeding mechanism for supplying said devices successively to said members by gravity, a pusher for acting on each device as it is fed, a spring for retracting the pusher, and a stop for the pusher to cause its sudden arrest rearwardly to produce a jar.

9. A machine for setting devices of the character described, comprising coöperating setting members, a chute for containing the devices and permitting them to descend by gravity, said chute having an escapement feed for the devices, spring jaws for holding each device in position to be set, a pusher to carry each device to said jaws, a spring for retracting the pusher, and a stop for the pusher to cause its sudden arrest rearwardly to produce a jar.

10. A machine for setting devices of the character described, comprising coöperating setting members, a chute having an escapement feed for the devices, spring jaws for holding each device in position to be set, a pusher to carry each device to said jaws, and means for holding said jaws spaced when desired to prevent a device that is advanced by the pusher from being retained by the jaws.

11. A machine for setting devices of the character described, comprising coöperating setting members, a chute, a pusher for positioning devices, a lever having a latch pivoted thereto and adapted to engage and disengage the pusher, and a spring for retracting the pusher.

12. A machine for setting devices of the character described, comprising coöperating setting members, a chute, a pusher for positioning the devices, a lever having a latch pivoted thereto and adapted to engage and disengage the pusher, means for automatically disengaging the latch from the pusher during backward movement of the latter, and a spring for retracting the pusher.

13. A machine for setting devices of the character described, comprising coöperating setting members, a chute, a pusher for positioning the devices, a lever having a latch pivoted thereto and adapted to engage and disengage the pusher, a spring for retracting the pusher, a cam at one side of the path of movement of the pusher, and means carried by the latch for engaging said cam to disengage the latch from the pusher during backward movement of the latter.

14. A machine for setting devices of the character described, comprising coöperating setting members, a chute, a pusher for positioning the devices, a lever having a latch pivoted thereto and adapted to engage and disengage the pusher, a spring for retracting the pusher, an arm pivotally mounted at one side of the path of movement of the pusher, said arm having a cam, and a spring for yieldingly holding the cam arm in position of rest, the latch having a pin movable past said cam in one direction to displace it, and adapted to engage the cam when moving in the other direction to oscillate the latch and disengage it from the pusher.

15. A machine for setting pronged devices of the character described, comprising coöperating setting members, a pusher for locating the devices between said setting members, said pusher having a pointed and beveled toe to enter between prongs of each one of the devices, a plate for said toe, and means for delivering the devices singly in front of the pusher.

16. A machine for setting pronged devices of the character described, comprising coöperating setting members, a chute, an escapement for controlling the supply of devices by said chute, a pusher for transferring the devices to position between the setting members, said pusher having a cam and having a projecting toe to enter between prongs of each one of the devices, and a pawl for controlling the escapement of the chute, said pawl having a projection to be engaged by the cam of the pusher.

17. A machine for setting pronged devices of the character described, comprising coöperating setting members, a chute, an escapement for controlling the supply of devices by said chute, a pusher for transferring the devices to position between the setting members, said pusher having a cam and having a projecting toe to enter between prongs of each one of the devices, a pawl for controlling the escapement, said pawl having a shoulder, and means for engaging said shoulder to lock the pawl in inoperative position.

18. A machine for setting devices of the character described, comprising coöperating setting members, a chute, an escapement for controlling the supply of devices by said chute, a pusher for transferring the devices to position between the setting members, said pusher having a cam, a pawl for controlling the escapement, said pawl having a shoulder, a slide for engaging the shoulder of the pawl to hold the latter in inoperative position, a lever for operating the pusher, and means for causing said lever, during a portion of its movement in one direction, to engage said slide to release the pawl.

19. A machine for setting devices of the character described, comprising coöperating setting members, a chute, a pusher for positioning the devices, means for actuating said pusher, a slide below the pusher and projecting therefrom to receive the devices from the chute, and lost motion connections between the pusher and slide for actuating the latter from the former.

20. A machine for setting devices of the character described, comprising coöperating setting members, a chute, a pusher for positioning the devices, means for actuating said pusher, a slide below the pusher and projecting therefrom to receive the devices from the chute, and lost motion connections between the pusher and slide for actuating the latter from the former, the pusher and slide having means for centering the devices.

21. A machine for setting devices of the character described, comprising coöperating setting members, a chute, a pusher for positioning the devices, means for actuating said pusher, a slide below the pusher and projecting therefrom to receive the devices from the chute, and lost motion connections between the pusher and slide for actuating the latter from the former, the pusher and slide having means for centering the devices, said centering devices comprising a pointed toe at the front end of the pusher, and a plate having edge recesses carried by the projecting end of the slide.

22. A machine for setting devices of the character described, comprising coöperating setting members, a chute, a pusher for positioning the devices, a slide below said pusher having a lost motion connection therewith, a reinforcing strip carried by said slide and having laterally projecting stop shoulders, a spring for retracting the pusher and slide, means for advancing said pusher and slide in opposition to the spring, and means for automatically disengaging the pusher from its actuating means during the rearward motion of said pusher and slide.

23. A machine for setting devices of the character described, comprising coöperating setting members, a chute, an escapement for the devices in said chute, said escapement having an arm, a spring for actuating said arm in one direction, a pusher for positioning the devices delivered by the escapement, said pusher having means for preventing a device in front of it from turning, and a pawl having means whereby it is actuated by movement of the pusher in one direction, said pawl being mounted to actuate the arm of the escapement.

24. A machine for setting devices of the character described, comprising coöperating setting members, a chute, a pusher for positioning the devices, an escapement having connections whereby it is actuated by said pusher, said escapement having a plate and an arm yieldingly connected therewith, said arm having an electrical contact, and a signal, including means coöperating with said contact to indicate a movement of the arm completely following the movement of the plate of the escapement.

25. A machine for setting devices of the character described, comprising coöperating members, a chute, a pusher for positioning the devices, an escapement having connections whereby it is actuated by said pusher, said escapement having a plate and an arm yieldingly connected therewith, said arm having an electrical contact, a pair of contacts carried by the chute in the path of movement of the escapement contact when the latter moves to its fullest extent, a signal, and an electrical connection between said signal and pair of contacts.

26. A machine for setting devices of the character described, comprising coöperating setting members, a chute having means for guiding the devices in predetermined perimetric positions, means for positioning the devices delivered by the chute, and stops at the sides of the chute near its lower portion for arresting misplaced devices.

27. A machine for setting devices of the character described, comprising coöperating setting members, a chute, an escapement for controlling the delivery of devices by the chute, a support on which the devices are delivered by the chute, said support having a buffer cushion, and a pusher for transferring the devices from said support to positions between the said members.

28. A machine for setting devices of the character described, comprising coöperating setting members, means for feeding the devices thereto in predetermined axial positions, and a clench plate magazine removably mounted in close relationship to said setting members, said magazine comprising two uprights shaped to hold the clench plates in axial positions corresponding to that of the devices fed to the setting members, a spring for holding the clench plates upwardly in said magazine, and a top stop formed to expose a portion of the uppermost clench plate.

29. A machine for setting devices having a continuous perimeter and having an opening therethrough non-symmetrical with respect to one axis of said device, comprising coöperating setting members, a chute, means for transferring the devices from the chute to said setting members, said means being constructed and arranged to insure uniformity in perimetric position of said opening and said device of all devices that reach position for setting, a clench-plate magazine in close relationship to said setting members, said magazine being formed to hold a column of clench plates corresponding in form to said devices, and to present said plates successively in a perimetric position corresponding to that of a device in position for setting, and means for separating the top clench plate in the magazine from the one next below it.

30. A machine for setting devices of the character described, comprising coöperating setting members, means for feeding the devices thereto in predetermined axial positions, a clench-plate magazine in close relationship to said setting members, said magazine being formed to present the clench-plates in axial positions corresponding to that of the devices fed to the setting members, and means for separating the top clench-plate in the magazine from the one next below it, said means comprising a spring-arm having a tongue normally out of contact with the clench plates and adapted to be shifted to position to enter between the two clench-plates mentioned.

In testimony whereof I have affixed my signature, in presence of two witnesses.

WILLIAM E. CHOATE.

Witnesses:
C. F. BROWN,
P. W. PEZZETTI.